US012657336B2

(12) United States Patent
Srinivasan et al.

(10) Patent No.: US 12,657,336 B2
(45) Date of Patent: Jun. 16, 2026

(54) AUTOMATED ROLE-BASED ACCESS CONTROL FOR PATIENT HEALTH INFORMATION SECURITY AND COMPLIANCE

(71) Applicant: GE Precision Healthcare LLC, Waukesha, WI (US)

(72) Inventors: Nivedha Srinivasan, Bangalore (IN); Khaleel Ahamad Nadaf, Bangalore (IN); Tejas Soali, Bangalore (IN)

(73) Assignee: GE Precision Healthcare LLC, Waukesha, WI (US)

( * ) Notice: Subject to any disclaimer, the term of this patent is extended or adjusted under 35 U.S.C. 154(b) by 150 days.

(21) Appl. No.: 18/588,897

(22) Filed: Feb. 27, 2024

(65) Prior Publication Data

US 2025/0272428 A1 Aug. 28, 2025

(51) Int. Cl.
*G06F 21/62* (2013.01)
(52) U.S. Cl.
CPC ............................... *G06F 21/6245* (2013.01)
(58) Field of Classification Search
CPC .................................................. G06F 21/6245
See application file for complete search history.

(56) References Cited

U.S. PATENT DOCUMENTS

| | | | | |
|---|---|---|---|---|
| 8,316,237 | B1 * | 11/2012 | Felsher | H04L 63/061 |
| | | | | 380/282 |
| 8,935,753 | B1 * | 1/2015 | Cha | G16H 40/20 |
| | | | | 726/4 |
| 10,033,766 | B2 * | 7/2018 | Gupta | H04L 63/20 |
| 10,701,094 | B2 * | 6/2020 | Kirti | H04L 63/1425 |
| 11,374,953 | B2 * | 6/2022 | Givental | G06F 16/55 |
| 11,575,680 | B1 * | 2/2023 | Challey | G06N 20/00 |
| 12,105,729 | B1 * | 10/2024 | Haq | G06F 16/93 |
| 12,260,000 | B2 * | 3/2025 | Kirti | G06F 21/6245 |
| 2010/0241595 | A1 * | 9/2010 | Felsher | G16H 10/65 |
| | | | | 707/E17.014 |
| 2012/0246098 | A1 * | 9/2012 | Chari | G06N 20/00 |
| | | | | 706/12 |
| 2013/0091539 | A1 * | 4/2013 | Khurana | G06F 21/577 |
| | | | | 726/1 |

(Continued)

OTHER PUBLICATIONS

Lee, Hung-Chang, and Shih-Hsin Chang. "RBAC-matrix-based EMR right management system to improve HIPAA compliance." Journal of medical systems 36.5 (2012): 2981-2992.*

(Continued)

*Primary Examiner* — Jimmy H Tran
(74) *Attorney, Agent, or Firm* — Amin, Turocy & Watson, LLP

(57) ABSTRACT

Systems or techniques that facilitate automated role-based access control for patient health information security and compliance are provided. In various embodiments, a system can access historical data corresponding to medical systems. In various aspects, the system can generate, based on the historical data, automated role-based access control rules. In various instances, the system can employ a trained machine learning model to detect, based on the automated RBAC rules, user access anomalies from audit logs of the medical systems. In various embodiments, the system can visually render the detected user access anomalies on a graphical user interface.

20 Claims, 11 Drawing Sheets

(56) References Cited

U.S. PATENT DOCUMENTS

| | | | | |
|---|---|---|---|---|
| 2013/0298192 A1* | 11/2013 | Kumar | | H04L 63/1425 |
| | | | | 726/25 |
| 2014/0109168 A1* | 4/2014 | Ashley | | H04L 63/20 |
| | | | | 726/1 |
| 2014/0337054 A1* | 11/2014 | Kulkarni | | G16H 10/60 |
| | | | | 705/3 |
| 2015/0046985 A1* | 2/2015 | D'Souza | | H04L 9/0825 |
| | | | | 726/4 |
| 2016/0359915 A1* | 12/2016 | Gupta | | H04L 43/04 |
| 2017/0171215 A1* | 6/2017 | Brucker | | H04L 63/1433 |
| 2018/0027006 A1* | 1/2018 | Zimmermann | | H04L 63/0227 |
| | | | | 726/11 |
| 2018/0084011 A1* | 3/2018 | Joseph | | H04L 63/20 |
| 2020/0251197 A1* | 8/2020 | Culbertson | | G16H 10/60 |
| 2020/0267162 A1* | 8/2020 | Koottayi | | G06F 21/50 |
| 2021/0165901 A1* | 6/2021 | Chandrashekhar | | G06N 20/20 |
| 2021/0281592 A1* | 9/2021 | Givental | | G06N 20/10 |
| 2022/0198015 A1* | 6/2022 | Webster | | G06F 21/57 |
| 2022/0366078 A1* | 11/2022 | Kirti | | G06N 5/022 |
| 2022/0377093 A1* | 11/2022 | Crabtree | | H04L 43/045 |
| 2022/0399112 A1* | 12/2022 | Bardot | | G16H 40/40 |
| 2023/0126571 A1* | 4/2023 | Kirti | | H04L 63/1441 |
| | | | | 726/22 |
| 2023/0199025 A1* | 6/2023 | Xu | | H04L 63/0869 |
| | | | | 726/22 |
| 2023/0245651 A1* | 8/2023 | Wang | | G06N 5/022 |
| | | | | 704/275 |
| 2024/0154993 A1* | 5/2024 | Andriukhin | | H04L 63/1433 |
| 2024/0430190 A1* | 12/2024 | Stevenson | | H04L 41/16 |
| 2025/0006377 A1* | 1/2025 | Soori-Arachi | | G16H 10/60 |
| 2025/0038954 A1* | 1/2025 | Stefanich | | H04L 9/0827 |
| 2025/0053685 A1* | 2/2025 | Hall | | G06F 21/6254 |
| 2025/0124150 A1* | 4/2025 | Sun | | G06F 21/604 |
| 2025/0125046 A1* | 4/2025 | Nandwana | | G16H 40/67 |
| 2025/0138798 A1* | 5/2025 | Mincey | | G06F 21/577 |
| 2025/0157609 A1* | 5/2025 | Shah | | G06F 21/602 |
| 2025/0165315 A1* | 5/2025 | Kostyulin | | G06F 21/604 |
| 2025/0245351 A1* | 7/2025 | Rahman | | G06F 11/3688 |
| 2025/0252216 A1* | 8/2025 | Kirti | | G06F 21/6245 |
| 2025/0253016 A1* | 8/2025 | Hafen | | G06F 16/248 |
| 2025/0274469 A1* | 8/2025 | Bar On | | H04L 63/1425 |
| 2025/0294047 A1* | 9/2025 | Brown | | H04L 63/1433 |

OTHER PUBLICATIONS

Zhou, Lu, et al. "Automatic fine-grained access control in SCADA by machine learning." Future Generation Computer Systems 93 (2019): 548-559.*

Lin, et al. "Compressive strength and elastic modulus of RBAC: An analysis of existing data and an artificial intelligence based prediction" Case Studies in Construction Materials, vol. 18, Jul. 2023, 30 pages.

Ghazal, et al. "Intelligent Role-Based Access Control Model and Framework Using Semantic Business Roles in Multi-Domain Environments" IEEE Access, vol. 8, 2020, 15 pages.

* cited by examiner

500

508 — Radiologist

Automated
Provisioning of
Roles and Access

502

Automated RBAC
Deployed on

504

Notify when new
user created

LDAP

506

510 — Access deviations and
anomalies are detected and
displayed in dashboard

Figure 6:
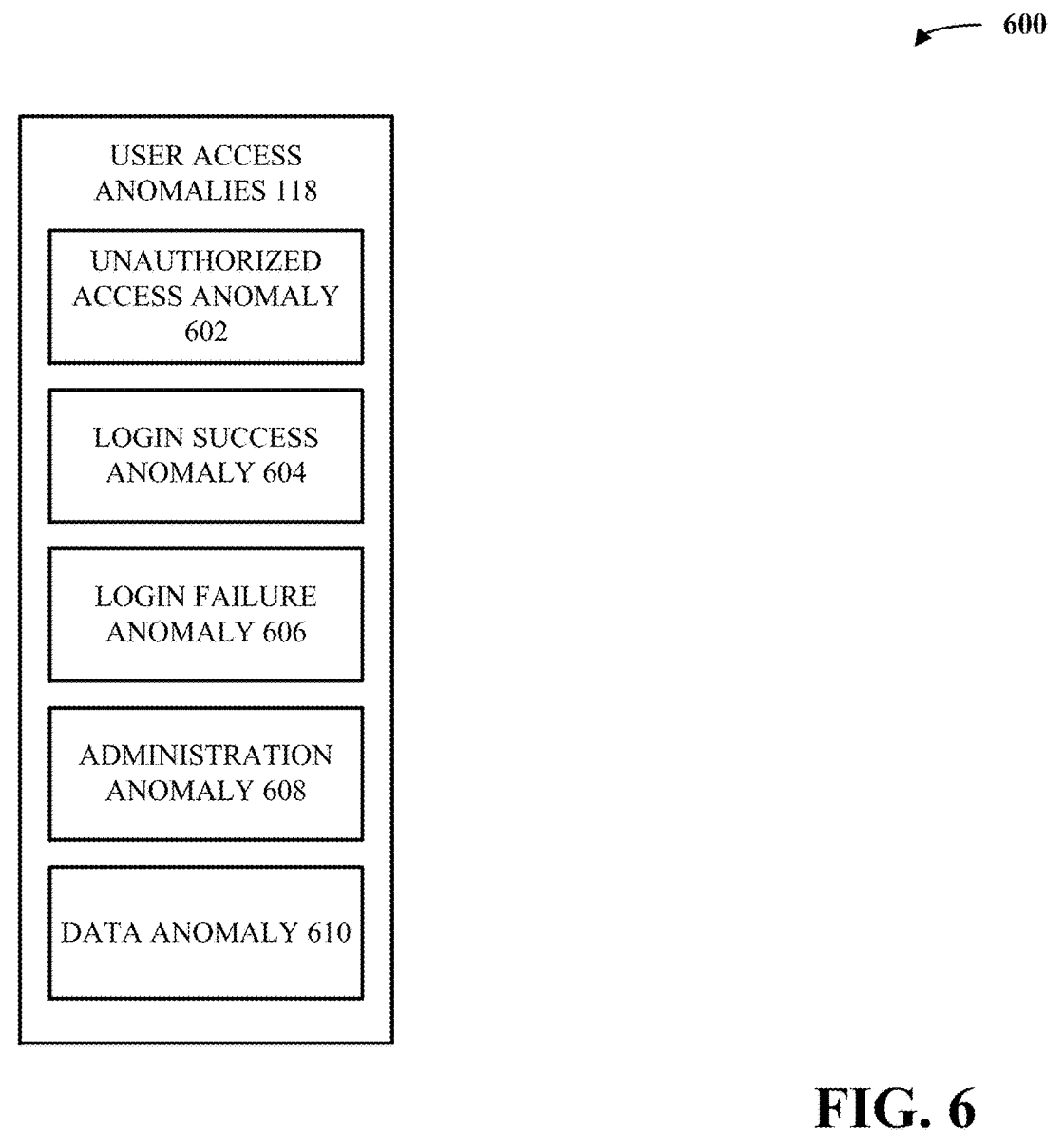

600

USER ACCESS ANOMALIES 118

UNAUTHORIZED ACCESS ANOMALY 602

LOGIN SUCCESS ANOMALY 604

LOGIN FAILURE ANOMALY 606

ADMINISTRATION ANOMALY 608

DATA ANOMALY 610

ACCESS HISTORICAL DATA CORRESPONDING TO MEDICAL SYSTEMS OR DEVICES — 902

GENERATE AUTOMATED RBAC RULES — 904

DETECT USER ACCESS ANAMOLIES — 906

IS A USER ACCESS ANOMALY DETECTED? — 908

N

Y

DISPLAY USER ACCESS ANOMALY — 910

REMEDIATE USER ACCESS ANOMALY — 912

AUTOMATED ROLE-BASED ACCESS CONTROL FOR PATIENT HEALTH INFORMATION SECURITY AND COMPLIANCE

TECHNICAL FIELD

The subject disclosure relates generally to role-based access control (RBAC), and more specifically to automated RBAC for protected health information (PHI) security and compliance.

BACKGROUND

In healthcare organizations, it can be desired to restrict system access to secure medical devices and PHI (protected health information) data. Various existing techniques accomplish such system access restriction through RBAC. Unfortunately, RBAC relies upon manual management that requires admins to manually control or update user roles, causing system access control to be time-consuming and prone to errors. Furthermore, RBAC depends on healthcare organizations to regularly review or monitor user access controls. Unfortunately, such techniques lack visibility and a centralized interface to track such data across the healthcare organization. Such lack of visibility can cause managing system access to be manually intensive and cause admins to create unnecessary configurations of user access controls. Moreover, RBAC defines access controls at a high-level and are coarse-grained. Unfortunately, such techniques fail to allow precise control of permissions or restrictions required by Health Insurance Portability and Accountability Act (HIPAA) and other healthcare regulations. Therefore, such techniques are prone to accidental disclosures of PHI and breaches of data privacy.

Systems or techniques that can provide system access control that involves a centralized view and precise access control without involving intensive manual management can be considered as desirable.

SUMMARY

The following presents a summary to provide a basic understanding of one or more embodiments. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus or computer program products that facilitate automated RBAC for PHI security and compliance are described.

According to one or more embodiments, a system is provided. The system can comprise a non-transitory computer-readable memory that can store computer-executable components. The system can further comprise a processor that can be operably coupled to the non-transitory computer-readable memory and that can execute the computer-executable components stored in the non-transitory computer-readable memory. In various embodiments, the computer-executable components can comprise an access component that can access historical data corresponding to medical systems. In various aspects, the computer-executable components can comprise a model component that can generate, based on the historical data, automated RBAC rules. In various instances, the computer-executable components can comprise a detection component that can employ a trained machine learning model to detect, based on the automated RBAC rules, user access anomalies from audit logs of the medical systems. In various embodiments, the computer-executable components can comprise a display component that can visually render, on a graphical user interface, the detected user access anomalies.

According to one or more embodiments, a computer-implemented method is provided. In various embodiments, the computer-implemented method can comprise accessing, by a device operatively coupled to a processor, historical data corresponding to medical systems. In various aspects, the computer-implemented method can comprise generating, by the device and based on the historical data, automated RBAC rules. In various instances, the computer-implemented method can comprise employing, by the device a trained machine learning model to detect, based on the automated RBAC rules, user access anomalies from audit logs of the medical systems. In various embodiments, the computer-implemented method can comprise visually rendering, by the device, the detected user access anomalies on a graphical user interface.

According to one or more embodiments, a computer program product for facilitating intelligent clinical user interfaces is provided. In various embodiments, the computer program product can comprise a non-transitory computer-readable memory having program instructions embodied therewith. In various aspects, the program instructions can be executable by a processor to cause the processor to access historical data corresponding to medical systems. In various instances, the program instructions can be further executable to cause the processor to generate, based on the historical data, automated RBAC rules. In various cases, the program instructions can be further executable to cause the processor to employ a trained machine learning model to detect, based on the automated RBAC rules, user access anomalies from audit logs of the medical systems. In various embodiments, the program instructions can be further executable to cause the processor to visually render the detected user access anomalies on a graphical user interface.

DESCRIPTION OF THE DRAWINGS

FIG. 6 illustrates an example, non-limiting block diagram of user access anomalies in accordance with one or more embodiments described herein.

DETAILED DESCRIPTION

Figure 1:
FIG. 1 illustrates a block diagram of an example, non-limiting system that facilitates automated RBAC for PHI security and compliance in accordance with one or more embodiments described herein.
Figure 1:
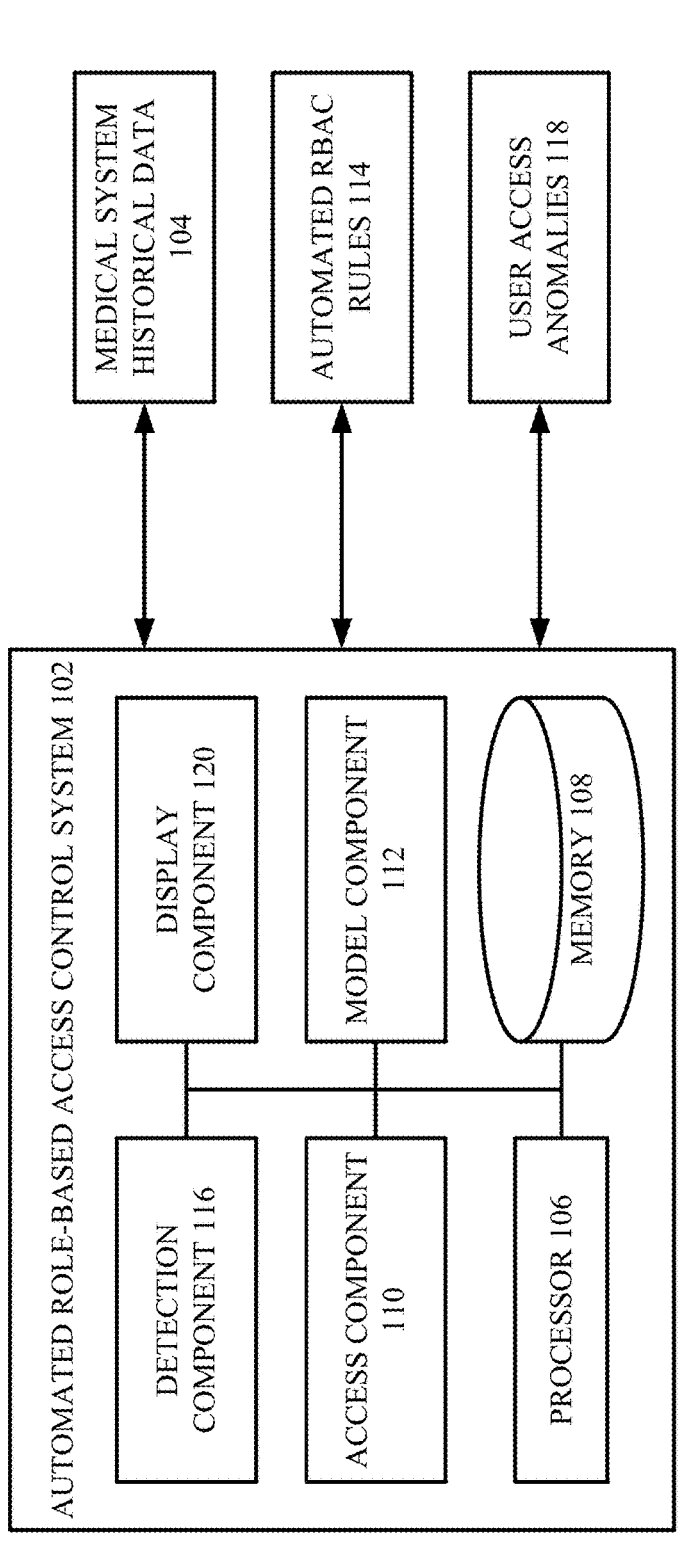

The following detailed description is merely illustrative and is not intended to limit embodiments or application/uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

RBAC is a security approach that restricts system access to authorized users based on the user's role within an organization (e.g., administrator, manager, nurse, technician). RBAC can ensure users only have the permissions necessary for the specific responsibilities corresponding to the user's role (e.g., read-only access, full access). Role assignment, role authorization, and permission authorization can be defined as three rules for RBAC. Role assignment states that a user can exercise permissions if the user has been assigned a role. Role authorization states that a user's active role must be authorized. Permission authorization states that a user can only exercise permissions that are authorized for the user's active role. For example, a user can be assigned the role of physician and role of physician can be authorized (e.g., authorized by an administrator). Accordingly, the user can exercise permissions that are authorized for the role of physician (e.g., read patient medical records, update patient medical records, create patient treatment plans).

RBAC systems are typically employed in healthcare organizations to restrict system access and secure medical devices and PHI data. Existing methods of implementing RBAC to facilitate such system access control are manually intensive and unadaptable to changing policies. Furthermore, existing methods lack precise user access control and a centralized interface for role management. In particular, when existing methods are implemented, administrators must manually update user access controls (e.g., manually create users, update user roles through user recreation, or delete users), frequently involving significant manual intervention. Such manual management can be prone to errors (e.g., privilege escalation, duplication of role grant access) that can lead to various security threats (e.g., data breaches of PHI, HIPAA violations), especially as the size of the healthcare organization increases. Additionally, when existing methods are implemented, administrators can often create configurations of roles or access controls that are redundant or not useful (e.g., create roles that are not used, assign roles to users that do not exist) due to the lack of a centralized interface. Moreover, existing methods provide only coarse-grained access controls that can cause permission access to unauthorized groups. For example, a surgical department and an imaging department can require access to electronic health records (EHR), however, the particular information required from the EHR for each department depends on the role of the users within the department. Such broad access controls are not adequate to define privileges for each role within the individual departments, causing insufficiencies with regulation compliance. In other words, the inventors of various embodiments described herein recognized that existing RBAC implementation is not automated, does not provide visibility to ease user management, and does not enable fine-grained access controls to comply with HIPAA and healthcare regulations.

Accordingly, systems or techniques that can address one or more of these technical problems can be desirable.

Various embodiments described herein can address one or more of these technical problems. One or more embodiments described herein can include systems, computer-implemented methods, apparatus, or computer program products that can facilitate automated RBAC for PHI security and compliance. In particular, various embodiments described herein can involve automated detection and remediation of user access anomalies, by leveraging medical system historical data to generate automated RBAC rules. Indeed, in some cases, the automated RBAC rules can define user access controls and permissions in a fine-grained manner, and user access anomalies that violate the automated RBAC rules can be automatically detected and rectified. In other cases, user access anomalies that violate the automated RBAC rules can be automatically detected, and the suitable parties (e.g., organizations, departments, management roles, patients) can be notified of such violations (e.g., notify a patient if PHI has been accessed by an unauthorized user, notify an administrator if an anomaly requires manual intervention). Furthermore, various embodiments described herein can involve detected ser access anomalies on a centralized interface to enable for an administrator visibility of data or users across a healthcare organization. In other words, existing techniques of RBAC implementation, as recognized by the present inventors, can be considered as manually intensive, insufficient to follow precise restrictions of HIPAA, and ineffective for visualization of users across a network. In contrast, various embodiments described herein can leverage historical data of medical systems to generate automated RBAC rules that are utilized to automatically detect user access anomalies (e.g., login failures, login successes, unauthorized data access) and rectify the user anomalies. Therefore, various embodiments described herein can be considered as being advantageous over existing techniques.

Various embodiments described herein can be considered as a computerized tool (e.g., any suitable combination of computer-executable hardware or computer-executable software) that can facilitate automated RBAC for PHI security and compliance. In various aspects, such computerized tool can comprise an access component, a model component, a detection component, or a display component.

In various embodiments, there can be historical data. In various aspects, the medical system historical data can correspond to any suitable medical system(s) or device(s) (e.g., CT, MR, PT, XR, WH, MIC, US). For example, historical data can correspond to any on-premise medical devices). In various instances, the historical data can indicate, quantify, convey, or otherwise represent any suitable data or attributes recorded by the medical systems or devices.

In various embodiments, the access component of the computerized tool can electronically receive or otherwise electronically access the historical data. In some aspects, the access component can electronically retrieve the historical data from any suitable centralized or decentralized data structures (e.g., graph data structures, relational data structures, hybrid data structures), whether remote from or local to the access component. In other aspects, the access component can electronically retrieve the historical data from whatever medical system or device they are measured, captured, or stored by. In any case, the access component can electronically obtain or access the historical data, such that the access component can serve as a conduit by which or through which other components of the computerized tool can electronically interact with (e.g., read, write, edit, copy, manipulate) the historical data.

In various embodiments, the model component of the computerized tool can electronically store, maintain, control, access, or otherwise execute a set of algorithms. In various instances, the set of algorithms can receive as input the medical system historical data to produce as output various RBAC rules. Accordingly, the model component can, in various cases, execute the set of algorithms on the historical data, and such execution can cause the set of algorithms to generate one or more RBAC rules that enforce compliance with HIPAA and healthcare regulations. In particular, the RBAC rules can ensure adherence to the HIPAA breach notification rule (e.g., requirement of HIPAA covered entities and their business associates to provide notification following a breach of patient data) and HIPAA privacy rule (e.g., appropriate PHI use and disclosure practices for healthcare organizations, defines rights for individuals to understand, access, and regulate how their medical information is used). In various aspects, the one or more RBAC rules can be any suitable electronic data that represents, conveys, indicates, describes, or otherwise characterizes rules that enforce compliance with HIPAA and healthcare regulations on user roles within a healthcare organization.

In various embodiments, the detection component can electronically receive or otherwise electronically access audit logs, the historical data, or customer sites data. In various aspects, the audit logs can correspond to any suitable medical system(s) or device(s). In various cases, the detection component can electronically receive or otherwise electronically access the one or more RBAC rules, from which the detection component can generate as output user access anomalies, detected based on the audit logs, the historical data, or the customer sites data.

In various embodiments, the display component of the computerized tool can electronically control any suitable electronic display (e.g., computer screen, smart phone screen). In various aspects, the display component can visually render, on that electronic display, a GUI, wherein user roles across a healthcare organization and user access anomalies can be viewed in a centralized dashboard. In various aspects, the GUI can depict, illustrate, or otherwise show in textual, numerical, or graphical fashion the real-time user access anomalies and centralized dashboard of user access controls.

For instance, suppose that the audit logs indicate that an unauthorized nurse attempted to transfer patient medical records to a third party. In some cases, the detection component can detect that the patient has not signed a consent form and generate a data anomaly (e.g., since the patient has not signed a consent form to transfer the medical records to a third party). Accordingly, the data anomaly can be visually rendered on the GUI to alert an administrator of the attempted data breach.

Furthermore, in various instances, the detection component can continuously, continually, or periodically check whether the real-time user access controls violate the automated RBAC rules. Accordingly, the display component can cause the GUI to depict or illustrate such anomalies.

Various embodiments described herein can be employed to use hardware or software to solve problems that are highly technical in nature (e.g., to facilitate automated RBAC for PHI security and compliance), that are not abstract and that cannot be performed as a set of mental acts by a human. Further, some of the processes performed can be performed by a specialized computer (e.g., deep learning neural network having internal parameters such as convolutional kernels) for carrying out defined acts related to clinical user interfaces. For example, such defined acts can include: accessing, by a device operatively coupled to a processor, historical data corresponding to medical systems; generating, by the device and based on the historical data, automated role-based access control (RBAC) rules; detecting, by the device and based on the automated RBAC rules, user access anomalies from audit logs of the medical systems; and visually rendering, by the device, the detected user access anomalies on a graphical user interface.

Such defined acts are not performed manually by humans. Indeed, neither the human mind nor a human with pen and paper can: electronically collect medical system historical data to generate automated RBAC rules, so as to cause user access anomalies to automatically detected to ease user management and prevent manual error for regulation compliance; electronically render a GUI that displays such user access anomalies when real-time users violate the automated RBAC rules; and electronically rectify the user access anomalies through automated scripts. Indeed, a GUI is an inherently-computerized construct that is electronically rendered or projected onto a computer screen and that cannot be meaningfully implemented in any way by the human mind without computers. Accordingly, a computerized tool that can electronically render user access anomalies on a GUI whose content provides a centralized visual dashboard for user management is likewise inherently-computerized and cannot be implemented in any sensible, practical, or reasonable way without computers. Similarly, an automated script is an inherently-computerized construct that is electronically executed on a computer and that cannot be meaningfully implemented in any way by the human mind without computers. Accordingly, a computerized tool that can electronically execute the automated scripts to rectify the user access anomalies is likewise inherently-computerized and cannot be implemented in any sensible, practical, or reasonable way without computers.

Moreover, various embodiments described herein can integrate into a practical application various teachings relating to automated RBAC for PHI security and compliance. As the present inventor recognized, such shortcomings of existing techniques can be ameliorated by automating RBAC. In particular, various embodiments described herein can involve producing as output one or more automated RBAC rules based on medical system historical data. Various embodiments described herein can, based on audit logs, historical data, or customer sites data, detect user access anomalies according to the automated RBAC rules. In various instances, various embodiments described herein can further include visually rendering detected user access anomalies on a GUI (e.g., visually rendered dashboard). In this way, various embodiments described herein can be considered as leveraging medical system historical data to generate automated RBAC rules (e.g., technician roles have no access to EHR, a defined maximum number of users can be deleted by an administrator within a defined threshold of time), of which can be utilized to automatically detect and display user access anomalies (e.g., an administrator attempts to delete a number of users exceeding the defined maximum within the defined threshold of time). In stark contrast, existing healthcare RBAC systems require manual overseeing of user access controls to detect and rectify anomalies.

For at least these reasons, various embodiments described herein facilitate improved RBAC for PHI security and compliance, as compared to existing techniques. Thus, various embodiments described herein certainly constitute a tangible and concrete technical improvement or technical advantage in the field of RBAC in healthcare organizations. Accordingly, such embodiments clearly qualify as useful and practical applications of computers.

Furthermore, various embodiments described herein can control real-world tangible devices based on the disclosed teachings. For example, various embodiments described herein can electronically collect real-world historical data from real-world medical systems or devices to electronically generate automated RBAC rules, from which real-world user access anomalies can be detected and rendered on GUIs on real-world computer screens.

Various embodiments described herein can decrease processing time for monitoring data due to more accurate RBAC rules or reduce bandwidth in data transmission between devices due to artificial intelligence enabled anomaly detection. Furthermore, various embodiments described herein can improve resource allocation and task prioritization for data monitoring due to artificial intelligence enabled detection of user access anomalies, thus decreasing processing time for anomaly detection and remediation.

It should be appreciated that the herein figures and description provide non-limiting examples of various embodiments and are not necessarily drawn to scale.

FIG. 1 illustrates a block diagram of an example, non-limiting system 100 that can facilitate automated RBAC for PHI security and compliance in accordance with one or more embodiments described herein. As shown, an automated RBAC system 102 can be electronically integrated, via any suitable wired or wireless electronic connections, with medical system historical data 104.

In various embodiments, the automated RBAC system 102 can comprise a processor 106 (e.g., computer processing unit, microprocessor) and a non-transitory computer-readable memory 108 that is operably or operatively or communicatively connected or coupled to the processor 106. The non-transitory computer-readable memory 108 can store computer-executable instructions which, upon execution by the processor 106, can cause the processor 106 or other components of the automated RBAC system 102 (e.g., access component 110, model component 112, detection component 116, display component 120) to perform one or more acts. In various embodiments, the non-transitory computer-readable memory 108 can store computer-executable components (e.g., access component 110, model component 112, detection component 116, display component 120), and the processor 106 can execute the computer-executable components.

In various embodiments, the medical system historical data 104 can correspond to or be associated with any suitable medical systems or medical devices. In various aspects, the medical system historical data 104 can be one or more scalars, one or more vectors, one or more matrices, one or more tensors, one or more character strings, or any suitable combination thereof that indicates, conveys, or otherwise represents any suitable data or attributes of the medical systems or medical devices.

In various embodiments, the automated RBAC system 102 can comprise an access component 110. In various embodiments, the access component 110 can electronically receive or otherwise electronically access the medical system historical data 104. In some aspects, the access component can electronically retrieve the medical system historical data 104 from any suitable centralized or decentralized data structures (e.g., graph data structures, relational data structures, hybrid data structures), whether remote from or local to the access component. In other aspects, the access component can electronically retrieve the medical system historical data 104 from whatever medical system or device they are measured, captured, or stored by. In any case, the access component can electronically obtain or access the medical system historical data 104, such that the access component can serve as a conduit by which or through which other components of the automated RBAC system 102 can electronically interact with (e.g., read, write, edit, copy, manipulate) the medical system historical data 104.

In various embodiments, the automated RBAC system 102 can comprise a model component 112. In various embodiments, the model component 112 can electronically store, maintain, control, access, or otherwise execute a set of algorithms. In various instances, the set of algorithms can receive as input the medical system historical data 104 to produce as output automated RBAC rules 114. Accordingly, the model component 112 can, in various cases, execute the set of algorithms on the medical system historical data 104, and such execution can cause the set of algorithms to generate the automated RBAC rules 114. In various aspects, the automated RBAC rules 114 can be any suitable electronic data that represents, conveys, indicates, describes, or otherwise characterizes rules that enforce compliance with HIPAA and healthcare regulations on user access roles within a healthcare organization.

In various cases, any suitable method to generate the automated RBAC rules 114 can be employed. In various instances, the model component 112 can electronically store, electronically maintain, electronically control, or otherwise electronically access a deep learning neural network. In various instances, the deep learning neural network can have or otherwise exhibit any suitable deep learning internal architecture. For instance, the deep learning neural network can have an input layer, one or more hidden layers, and an output layer. In various instances, any of such layers can be coupled together by any suitable interneuron connections or interlayer connections, such as forward connections, skip connections, or recurrent connections. Furthermore, in various cases, any of such layers can be any suitable types of neural network layers having any suitable learnable or trainable internal parameters. For example, any of such input layer, one or more hidden layers, or output layer can be convolutional layers, whose learnable or trainable parameters can be convolutional kernels. As another example, any of such input layer, one or more hidden layers, or output layer can be dense layers, whose learnable or trainable parameters can be weight matrices or bias values. As still another example, any of such input layer, one or more hidden layers, or output layer can be batch normalization layers, whose learnable or trainable parameters can be shift factors or scale factors. As even another example, any of such input layer, one or more hidden layers, or output layer can be LSTM layers, whose learnable or trainable parameters can be input-state weight matrices or hidden-state weight matrices. Further still, in various cases, any of such layers can be any suitable types of neural network layers having any suitable fixed or non-trainable internal parameters. For example, any of such input layer, one or more hidden layers, or output layer can be non-linearity layers, padding layers, pooling layers, or concatenation layers.

No matter the internal architecture of the deep learning neural network, the deep learning neural network can be configured to make various determinations that are pertinent to the automated RBAC rules 114 or user access requests, based on inputted medical system data. Accordingly, in various instances, the model component 112 can electronically execute the deep learning neural network on the medical system historical data 104, and such execution can cause the deep learning neural network to generate the automated RBAC rules 114 or user access inferences (e.g., user access permissions, request handling, user role assignments, policy assignment, password recovery, user creation, user deletion, policy updates, group updates, roles updates).

In various instances, the model component 112 can, in various aspects, execute the deep learning neural network on the medical system historical data 104, and such execution can cause the deep learning neural network to generate the automated RBAC rules 114 or user access inferences. More specifically, the model component 112 can feed the medical system historical data 104 to an input layer of the deep learning neural network. In various instances, the medical system historical data 104 can complete a forward pass through one or more hidden layers of the deep learning neural network. In various cases, an output layer of the deep learning neural network can generate the automated RBAC rules 114 or user access inferences, based on activation maps or intermediate features produced by the one or more hidden layers.

In various embodiments, the automated RBAC system 102 can comprise a detection component 116. In various embodiments, the detection component 116 can electronically receive or otherwise electronically access audit logs, the historical data, or customer sites data. In various aspects, the audit logs can correspond to any suitable medical system(s) or device(s). In various cases, the detection component 116 can electronically receive or otherwise electronically access the automated RBAC rules 114. In various instances, the detection component 116 can electronically receive or otherwise electronically access a trained machine learning model. Therefore, the detection component 116 can detect and generate, via the trained machine learning model, as output user access anomalies 118 based on the audit logs, the historical data, or the customer sites data. Various example, non-limiting user access anomalies 118 are described with respect to FIG. 6.

In various embodiments, the machine learning model can be trained to detect the user access anomalies 118 by accessing the medical system historical data 104. In various aspects, data from the medical system historical data 104 can be determined to be anomalous or not anomalous. Such data labels can be determined based on past actions taken by administrators in response to such medical system historical data 104. For example, if an intern in a healthcare organization accessed patient medical records and, in response, an administrator revoked access from the intern, user access involving interns accessing patient medical records can be labeled as anomalous. Determination if data is anomalous or not anomalous can be further based on the automated RBAC rules 114. For example, the automated RBAC rules 114 can regulate user creations by an administrator, where an administrator can create a limited number of users within a defined time frame. Such a rule can be used to label user access as anomalous if more than the limited number of users have been created by an administrator. In various aspects, the machine learning model can be fed the labeled data, therefore the machine learning model can learn patterns or relationships that distinguish anomalous user access from non-anomalous user access (e.g., user access frequency, user behavior patterns, sequences of user actions, durations of access). During training, each training datapoint in the labeled data can be passed forward through the machine learning model. For each training datapoint, the machine learning model can calculate an output based on current parameters. For example, the machine learning model can produce output of whether a user access anomaly has been detected. Therefore, a loss function can be calculated to determine the error between output and input labeled data, wherein backpropagation can be employed to update model parameters. In various aspects, after iterative training and fine-tuning, the machine learning model can be trained until it achieves a desired level of accuracy and performance in distinguishing between anomalous and non-anomalous user access patterns, and therefore considered a trained machine learning model. In various cases, other methods can be employed to train the machine learning model to detect the user access anomalies 118. For example, methods of artificial intelligence enabled training of the machine learning model are described with respect to FIG. 4. No matter the method employed to train the machine learning model, the machine learning model can be considered a trained machine learning model after achieving a desired level of accuracy and performance in distinguishing between anomalous and non-anomalous user access patterns.

For instance, the automated RBAC rules 114 can define which user roles (e.g., or groups) have permissions or access to an on-premise CT scanner (e.g., lab technician has access). Furthermore, a lab technician can have their user role updated to a different user role that does not have access to the CT scanner. The detection component 116 can therefore access medical device audit logs to identify a user access anomaly if the user role update is not reflected in the user permissions (e.g., lab technician accesses the CT scanner after updating user role to an unauthorized user role). In some cases, the automated RBAC rules 114 can define conditions to allow password recovery for a user (e.g., identity verification, frequency of password recovery). In other instances, the automated RBAC rules 114 can regulate user creation or deletion. For example, the automated RBAC rules 114 can determine a limit on how many users can be created or deleted within a time frame. In yet other instances, the automated RBAC rules 114 can regulate updating of user roles, groups, or policies. For example, the automated RBAC rules 114 can define a limit on how many users in a particular group can change roles simultaneously. As another example, the automated RBAC rules 114 can specify requirements for an update in role, group, or policy (e.g., authorization by an administrator).

In various embodiments, the automated RBAC system 102 can comprise a display component 120. In various embodiments, the display component 120 can electronically control any suitable electronic display (e.g., computer screen, smart phone screen). In various aspects, the display component can visually render, on that electronic display, a GUI, wherein user access controls can be viewed in a centralized dashboard. In various aspects, the GUI can depict, illustrate, or otherwise show in textual, numerical, or graphical fashion the user access anomalies 118 in a centralized dashboard of user access controls. Therefore, an administrator can be made aware of user access anomalies 118 without manual monitoring and, if necessary, take appropriate action to remediate the user access anomalies 118.

Figure 2:
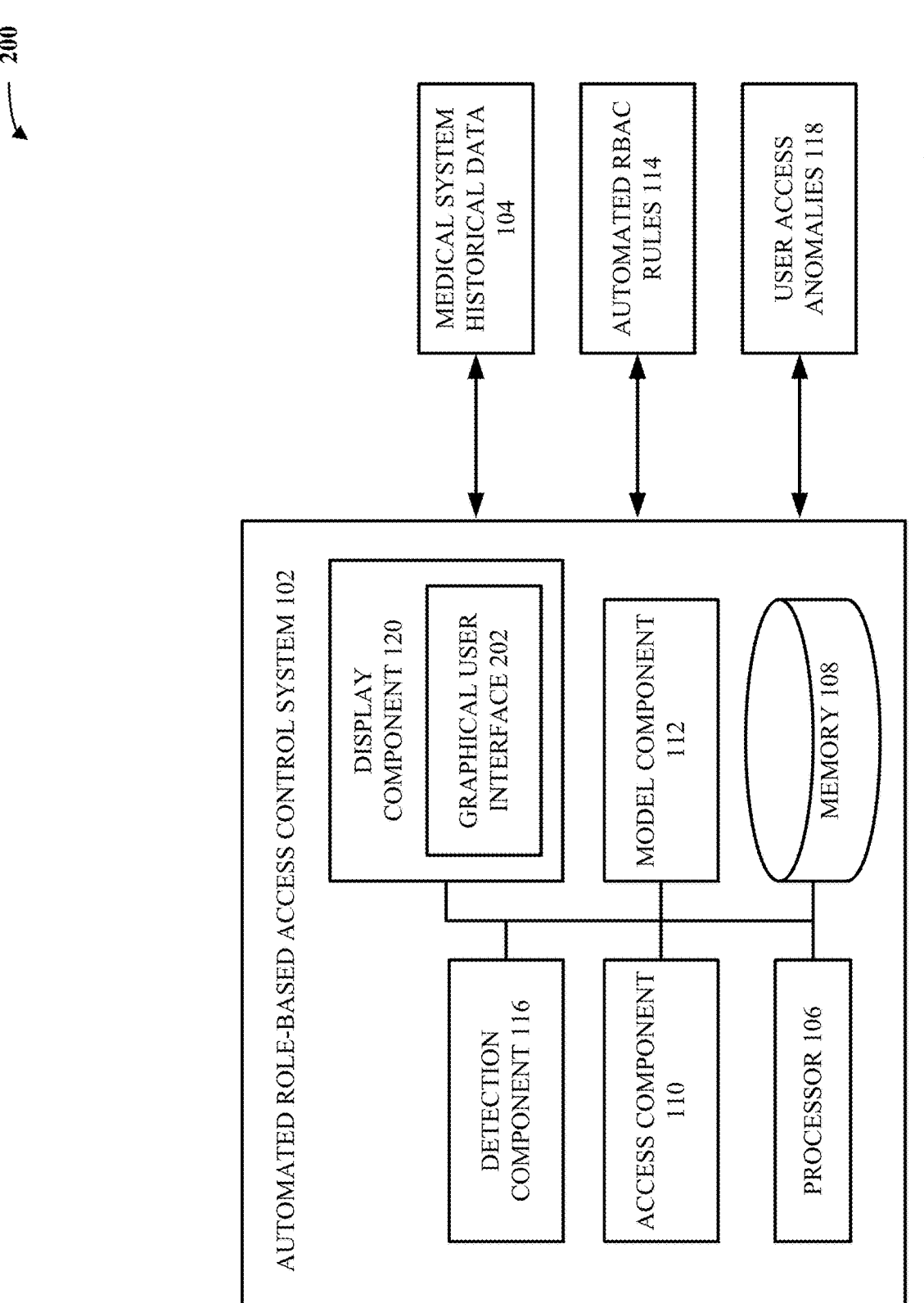
FIG. 2 illustrates a block diagram of an example, non-limiting system including a graphical user interface that facilitates automated RBAC for PHI security and compliance in accordance with one or more embodiments described herein.

FIG. 2 illustrates a block diagram of an example, non-limiting system 200 including a graphical user interface that can facilitate automated RBAC for PHI security and compliance in accordance with one or more embodiments described herein. As shown, the system 200 can, in some cases, comprise the same components as the system 100, and can further comprise a graphical user interface 202 (e.g., GUI 202).

In various embodiments, the display component 120 can electronically generate GUI 202. In various aspects, the display component 120 can visually render, or otherwise cause to be visually rendered, the GUI 202 on any suitable electronic display of any suitable computing device. As a non-limiting example, the display component 120 can cause the GUI 202 to be rendered on an electronic computer screen of any suitable smart phone device (e.g., a smart phone of the administrator). As even another non-limiting example, the display component 120 can cause the GUI 202 to be rendered on an electronic computer screen of any suitable hospital console device. In any case, the GUI 202 can visually render a dashboard comprising an overview of user access controls and user access anomalies 118, and can thus be considered as being centralized visualization to an administrator (e.g., manager) of the user access controls.

For example, if an anomaly is detected by the detection component 116 that can contribute to violation of HIPAA privacy rules, the display component 120 can visually render on the GUI 202 in real-time the identified user access anomaly. Therefore, an administrator can promptly be made aware of such anomaly and take sufficient action to rectify the anomaly, preventing the violation.

Figure 3:
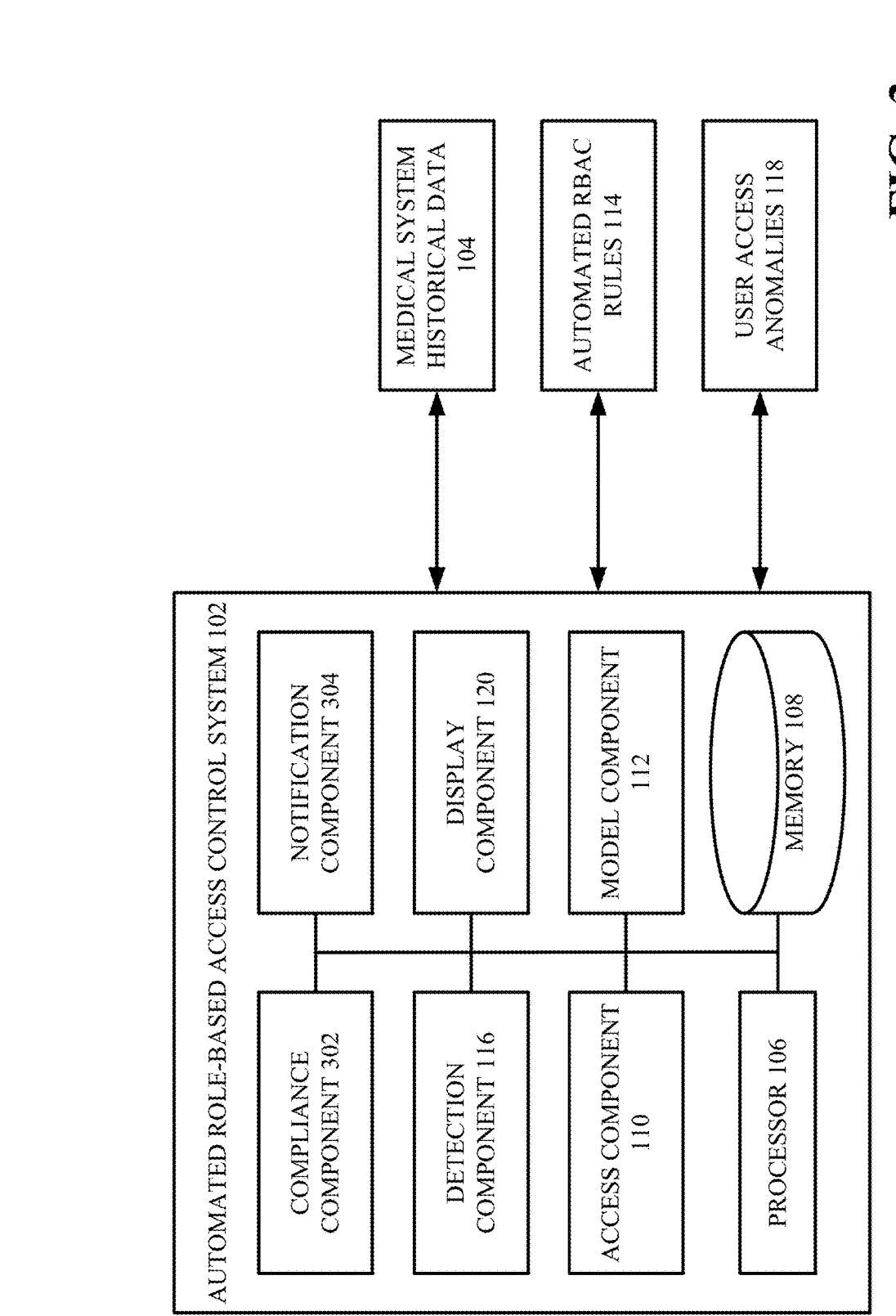
FIG. 3 illustrates a block diagram of an example, non-limiting system including a compliance component and a notification component that facilitates automated RBAC for PHI security and compliance in accordance with one or more embodiments described herein.

FIG. 3 illustrates a block diagram of an example, non-limiting system 300 including a compliance component and a notification component that facilitates automated RBAC for PHI security and compliance in accordance with one or more embodiments described herein. As shown, the system 300 can, in some cases, comprise the same components as the system 200, and can further comprise a compliance component 302 and a notification component 304.

In various embodiments, the compliance component 302 can, in response to detection of user access anomalies 118, execute one or more automated scripts to rectify the user access anomalies 118. In various cases, any suitable algorithm or automated script can be executed to rectify the user access anomalies 118 according to the automated RBAC rules 114. In particular, the compliance component 302 can block, or otherwise prevent, unauthorized access to healthcare resources (e.g., lock user login, block unauthorized attempt to access PHI, prevent unauthorized transfers or use of PHI, restrict unauthorized devices from connecting to the network). No matter the anomaly type, the compliance component 302 can enforce compliance with HIPAA regulations and standards by preventing unauthorized actions from occurring.

In various aspects, the compliance component 302 can perform any suitable action to remediate the user access anomalies 118 (e.g., assign policies, update user roles, update user permissions, update user groups, update policies, create users, delete users, revoke access, password management). In various embodiments, the automated scripts can perform such actions through Security Orchestrations Automated Response (SOAR) (e.g., a software that enables integration and coordination of automated responses to security threats). Following remediation of the user access anomalies 118, the display component 120 can render the detected anomalies on the GUI 202. In various instances, the display component 120 can specify which anomalies have been remediated and which anomalies require manual intervention, so as to provide further visibility to the system administrator of user access across the healthcare organization.

In various embodiments, the compliance component 302 can engage the notification component 304 to transmit an alert or message to any necessary parties in response to an access anomaly. For instance, if an unauthorized user attempted to share or had shared a patient's PHI (e.g., any action violating HIPAA or healthcare regulations), the notification component 304 can electronically transmit an alert to the patient. In other instances, the notification component 304 can electronically transmit a warning to the unauthorized user who attempted to share or had shared the patient's PHI. Furthermore, the notification component 304 can alert the necessary administration staff of the attempted sharing or breached PHI. In various aspects, in response to an anomaly that was detected due to, for example, an expire or missing signed consent for PHI disclosure, the notification component 304 can electronically notify the patient of the expired consent or remind the patient to provide signed consent.

Figure 4:
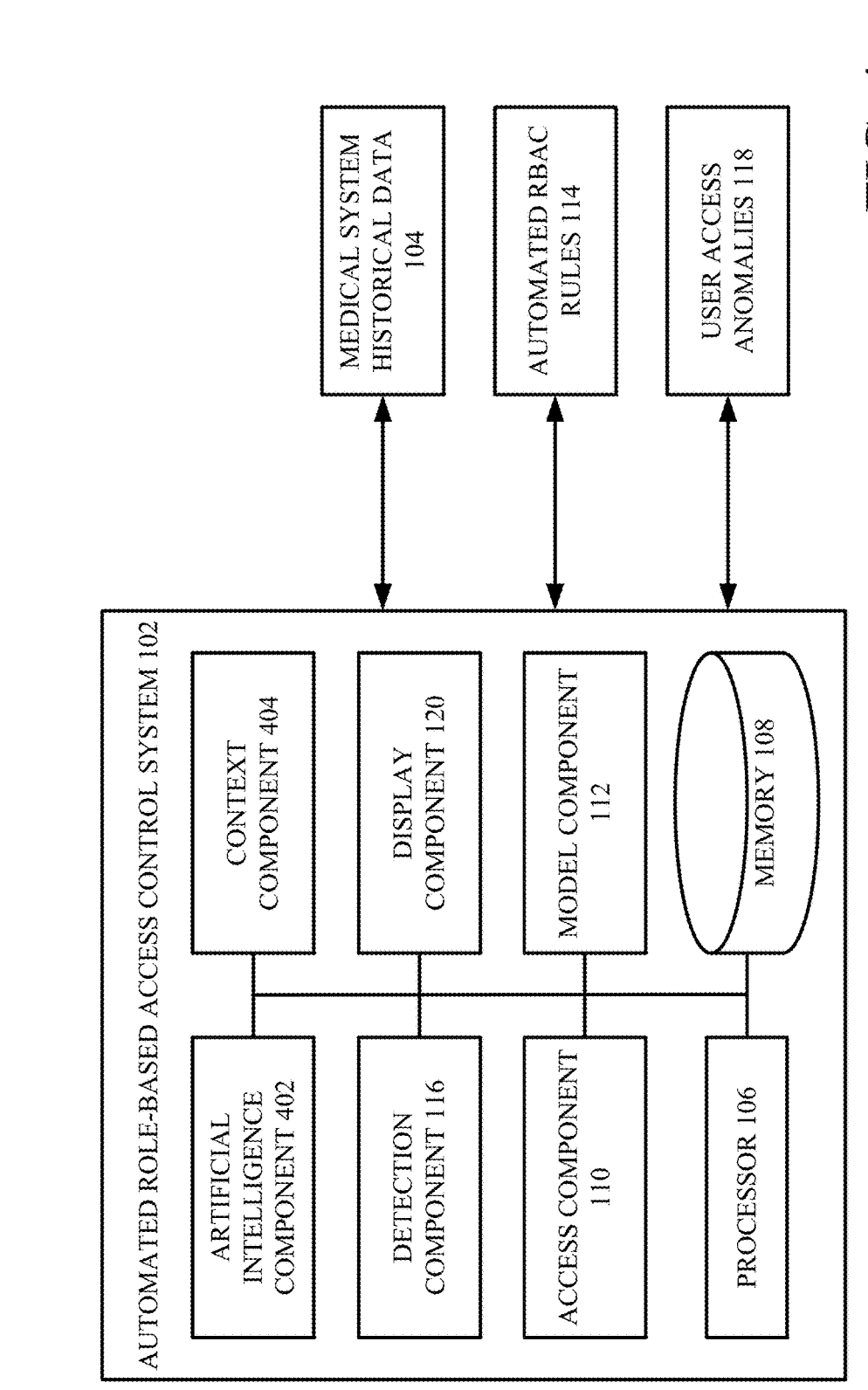
FIG. 4 illustrates a block diagram of an example, non-limiting system including an artificial intelligence component and a context component that facilitates automated RBAC for PHI security and compliance in accordance with one or more embodiments described herein.

FIG. 4 illustrates a block diagram of an example, non-limiting system including an artificial intelligence component and a context component that facilitates automated RBAC for PHI security and compliance in accordance with one or more embodiments described herein. As shown, the system 400 can, in some cases, comprise the same components as the system 300, and can further comprise an artificial intelligence component 402 and a context component 404.

In various embodiments, the model component 112 can engage the artificial intelligence component 402 to generate (e.g., via the deep learning neural network) the automated RBAC rules 114 and manage user requests. In various instances, the detection component 116 can engage the artificial intelligence component 402 to detect the user access anomalies 118. In various aspects, the artificial intelligence component 402 can electronically maintain, control, or otherwise access the deep learning neural network or the machine learning model. In various instances, the artificial intelligence component 402 can facilitate training of the deep learning neural network or the machine learning model to make intricate decisions regarding role-based privileges. For instance, the artificial intelligence component 402 can actively monitor and analyze manual remediation decisions made by administrators in response to user access anomalies. In other words, the artificial intelligence component 402 can be trained to make user access inferences or decisions based on actions made by administrators. For example, an anomaly can be identified involving a nurse who only has permission to view patient records in their assigned ward. However, the nurse is observed accessing patient records in multiple wards without authorization. In response to the detected anomaly, an administrator can temporarily suspend the nurse's access to patient records across all wards, and based on a policy review, can update role permissions. Thus, the artificial intelligence component 402 can learn to map input features (e.g., user role, requested permissions) to output decisions (e.g., grant, access, deny access, update user permissions) by observing the decisions made by administrators in a training dataset (e.g., historical data of administrative actions in response to user requests or anomalies, real-time decisions made by administrators).

In various embodiments, the artificial intelligence component 402 can engage the context component 406 to provide contextual information in decision or inference making pertaining to user access. In various aspects, the context component 404 can provide intrinsic or extrinsic information of user requests to the artificial intelligence component 402. For instance, the context component 404 can include information regarding a user's role, a user's requested access permissions, a user's employment history, or a user's access request history. In some cases, the context component 406 can provide what the request is in relation to, and therefore enable the artificial intelligence component 402 to make an appropriate decision. For example, a request to access a medical closet that stores controlled substances can receive more scrutiny from the artificial intelligence component 402 to make a user access decision than a request to access a closet that stores cleaning supplies. More specifically, if a request is made to access the medical closet containing controlled substances, the artificial intelligence component 402 can engage the context component 404 to provide further information on the user requesting access or the circumstances from which the request is made. For instance, the context component 404 can provide information on the requesting user's access history (e.g., request frequency for the controlled substance closet). If the user has requested access to the medical closet containing controlled substances with a higher frequency than other users of the same role permissions, the artificial intelligence component 402 can temporarily restrict access to prevent potential illicit utilization of controlled substances. Conversely, if the access request was made for the cleaning supply closet, the artificial intelligence component 402 can refrain from engaging the context component 404 to provide further information on the context of the request, as excessive access to the closet does not pose violations to healthcare regulations.

Furthermore, in various aspects, the context component 404 can provide contextual data to facilitate training of the deep learning neural network. For instance, the context component 404 can enable the artificial intelligence component 402 to train the deep learning neural network based on an individual. More specifically, the artificial intelligence component 402 can learn to make user access decisions based on actions or attributes of the user, provided by the context component 404. For example, a user access decision regarding an employee with 15 years of experience and no previous record of misusing access permissions can be different than a user access decision regarding an employee who was recently hired, regardless of if all other contextual information is the same (e.g., what is being requested, when it is requested, user roles, user permissions). Therefore, for instance, the artificial intelligence component 402 can learn to make decisions with higher confidence if an employee with more years of experience and no previous record of access misuse is requesting access.

In various embodiments, the artificial intelligence component 402 can perform utility-based cost analysis to generate user access inferences. More specifically, the artificial intelligence component 402 can perform utility-based cost analysis to evaluate the costs or benefits associated with user access decisions (e.g., deny access, suspend access, grant access, update permissions). For example, costs associated with executing an automated action can include potential security risks, data privacy concerns, or resource utilization (e.g., granting access can lead to data breaches or misuse of resources). In various cases, the utility of making a user access decision can depend on factors such as the requested resources, credibility of the user (e.g., employment history), severity of the security threat, sensitivity of the information, or necessity to maintain compliance. In various aspects, based on training data (e.g., administrator actions), the artificial intelligence component 402 can perform utility-based cost analysis to determine, with a high degree of confidence, that executing the automated action will not involve significant cost, and thus can execute the automated action. Conversely, if the artificial intelligence component 402 determines with low confidence that executing the automated action will not involve significant cost, the artificial intelligence component 402 can refrain from executing the automated action to maintain security or compliance.

Figure 5:
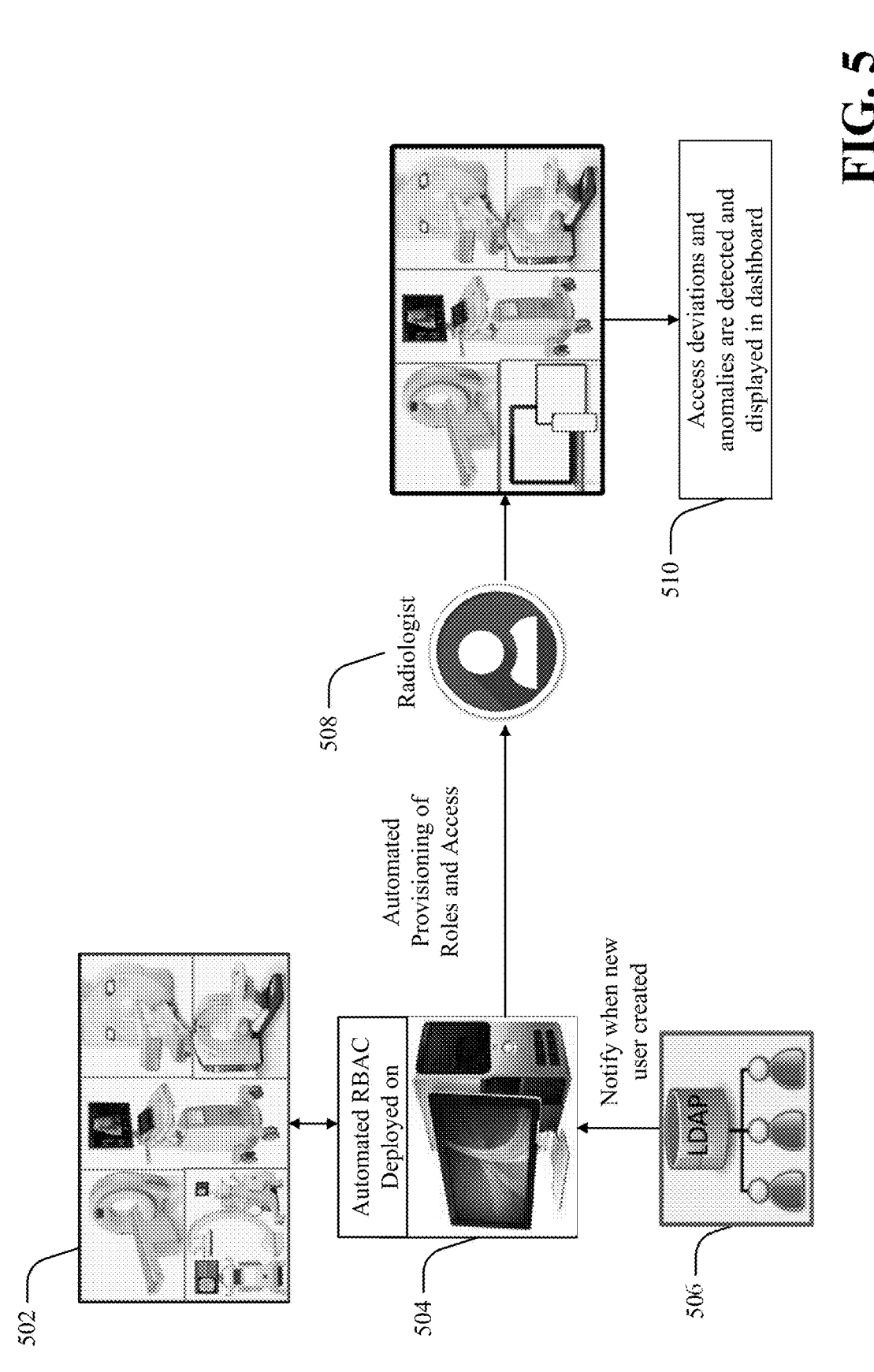
FIG. 5 illustrates a diagram of an example, non-limiting system that facilitates automated RBAC for PHI security and compliance in accordance with one or more embodiments described herein.

FIG. 5 illustrates a diagram of an example, non-limiting system that facilitates automated RBAC for PHI security and compliance in accordance with one or more embodiments described herein.

In various aspects, automated RBAC rules 114 can be deployed on any suitable electronic device (e.g., 504). Furthermore, the detection component 116 can continuously receive historical data and audit logs from medical devices 502. In various instances, a central lightweight directory access protocol (LDAP) 506 can be utilized for user verifications. Therefore, when, for example, a new user is created, the new user can be verified by LDAP 506, and thus the user can automatically be assigned role permissions and access based on the automated RBAC rules 114. For example, if a new user 508 is assigned a radiologist role, the new user 508 will automatically be granted permissions corresponding the radiologist role (e.g., access to x-ray equipment) without manual user management. In various aspects, access deviations or anomalies (e.g., new user 508 has a compromised account from excessive successful logs) can then be detected and displayed in a dashboard that is visually rendered on GUI 202 (e.g., 510).

FIG. 6 illustrates an example, non-limiting block diagram of user access anomalies in accordance with one or more embodiments described herein.

Although the herein disclosure specifies a set of user access anomalies 118 that can be detected, these are mere non-limiting examples for ease of explanation. For instance, the user access anomalies 118 can include, but are not limited, to an unauthorized access anomaly 602, a login success anomaly 604, a login failure anomaly 606, an administration anomaly 608, or a data anomaly 610. In various aspects, the user access anomalies 118 can comprise any suitable number (e.g., one or more) of types of anomalies.

In various aspects, the detection component 116 can identify an unauthorized access anomaly 602. In various cases, unauthorized access anomaly 602 can involve a user attempting to access resources that the assigned user role does not have access to. In other cases, the unauthorized access anomaly 602 can involve a user not having access to resources that the user should have access to. For example, if user's role changes but, for any reason, permissions do not update according to the new role assignment, the unauthorized access anomaly 602 can be detected if the user attempts to access the previously authorized resource.

In various aspects, the detection component 116 can identify a login success anomaly 604. In various cases, login success anomaly 604 can involve a user completing a large number of successful login attempts within a specified duration (e.g., hourly, daily, weekly). More specifically, if a user successfully logs in a number of times that exceeds a defined maximum amount for a defined duration of time, the login success anomaly 604 can be detected. For example, the maximum number of successful login attempts can be defined as five attempts and the specified duration of time can be defined as three hours (e.g., can be defined by an administrator). If a user successfully logs in five times within one hour, the detection component 116 can identify the login success anomaly 604. Thus, the compliance component 302 can block or restrict future logins for the following two hours, thereby preventing possible unauthorized access and regulation violations (e.g., a computer was left on and logged in, allowing another unauthorized user access to the login credentials).

In various aspects, the detection component 116 can identify a login failure anomaly 606. In various cases, login failure anomaly 606 can involve a user attempting a large number of failed login attempts within a specified duration (e.g., hourly, daily, weekly). More specifically, if a user attempts to log in a number of times that exceeds a defined maximum amount for a defined duration of time, the login failure anomaly 606 can be detected. For example, the maximum number of failed login attempts can be defined as three attempts and the specified duration of time can be defined as one day. If a user fails three login attempts within a half hour, the detection component 116 can identify the login failure anomaly 606. Thus, the compliance component 302 can block or restrict future logins (e.g., successful or unsuccessful) for the remainder of the day, thereby preventing possible unauthorized access and regulation violations.

In various aspects, the detection component 116 can identify an administration anomaly 608. In various cases, the administration anomaly 608 can involve an administrator user executing a number of administrator activities that exceeds a defined maximum threshold within a specified duration (e.g., hourly, daily, weekly). In various instances, administration activities can comprise, but are not limited to, user creation, user deletion, user updates). As a non-limiting example, the maximum number of users that can be deleted or created within one week can be five users. If an administrator deletes five users within one day, the administration anomaly 608 can be detected. Therefore, the compliance component 302 can restrict further execution of administration activities by the user, thereby preventing possible misuse of administration permissions. As another non-limiting example, if an administrator creates five users within one day, the administration anomaly 608 can be detected, and thus creation of additional users can be restricted to prevent access by a compromised account (e.g., a compromised account may create fake accounts for unauthorized access).

In various aspects, the detection component 116 can identify a data anomaly 610. In various cases, data anomaly 610 can involve an attempted disclosure of PHI when a HIPAA authorization expiration date has passed. Therefore, the compliance component 302 can block the attempted PHI disclosure and engage the notification component 304 to contact (e.g., notify, alert) the corresponding patient. Data anomaly 610 is not limited to the anomalies described herein. Data anomaly 610 can involve, for example, any user access discrepancies or inconsistencies in regard to patient data or authorization dates.

Further, in various aspects, user behavior or activity can be tracked and monitored over multiple services or systems. For example, if a user logs in on multiple devices, the total number of login attempts across all devices will be used to determine if the number of log in attempts exceeds the defined maximum.

Figure 7:
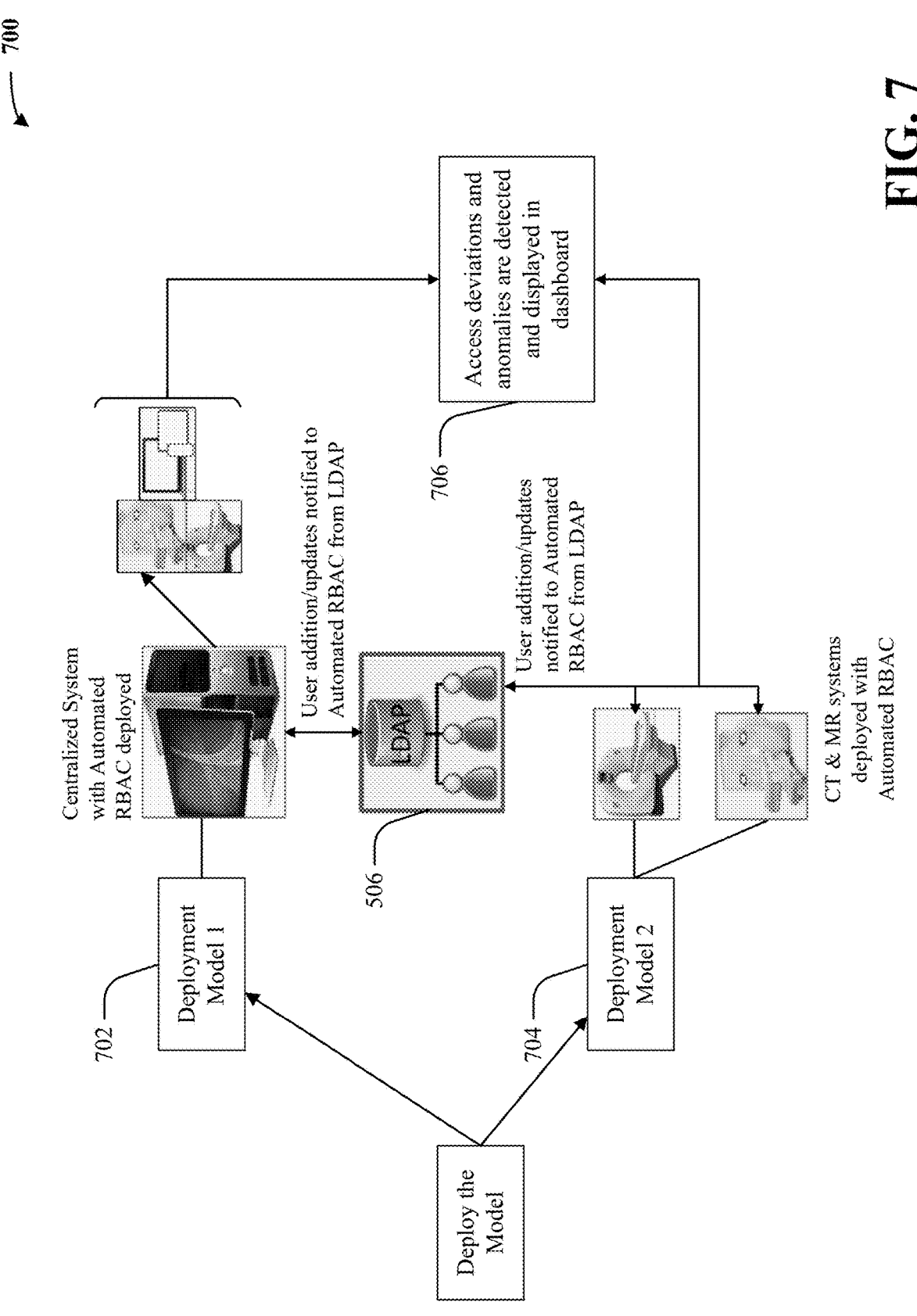
FIG. 7 illustrates a diagram of an example, non-limiting system that facilitates deployment of an automated RBAC system in accordance with one or more embodiments described herein.

FIG. 7 illustrates a diagram of an example, non-limiting system that facilitates deployment of an automated RBAC system in accordance with one or more embodiments described herein.

In various embodiments, the automated RBAC system 102 can be deployed by two methods. According to deployment model 702, the automated RBAC system 102 can be deployed with a centralized server. According to deployment model 704, the automated RBAC system 102 can be deployed with host systems (e.g., CT, MR, PT). In deployment model 702, microservices running on the centralized server can be notified in response to creation, deletion, or updating of a user onto LDAP 506. Thus, the microservices running on the server can assign the authorized permissions (user role, user group, user policies) according to user request (e.g., creation, deletion, or updating). Conversely, in the deployment model 704, the automated RBAC system 102 can assign the authorized permissions (user role, user group, user policies) according to user request (e.g., creation, deletion, or updating). In various aspects, no matter the deployment method, access deviations and anomalies can be detected and displayed in a dashboard that is visually rendered on GUI 202 (e.g., 706).

Figure 8:
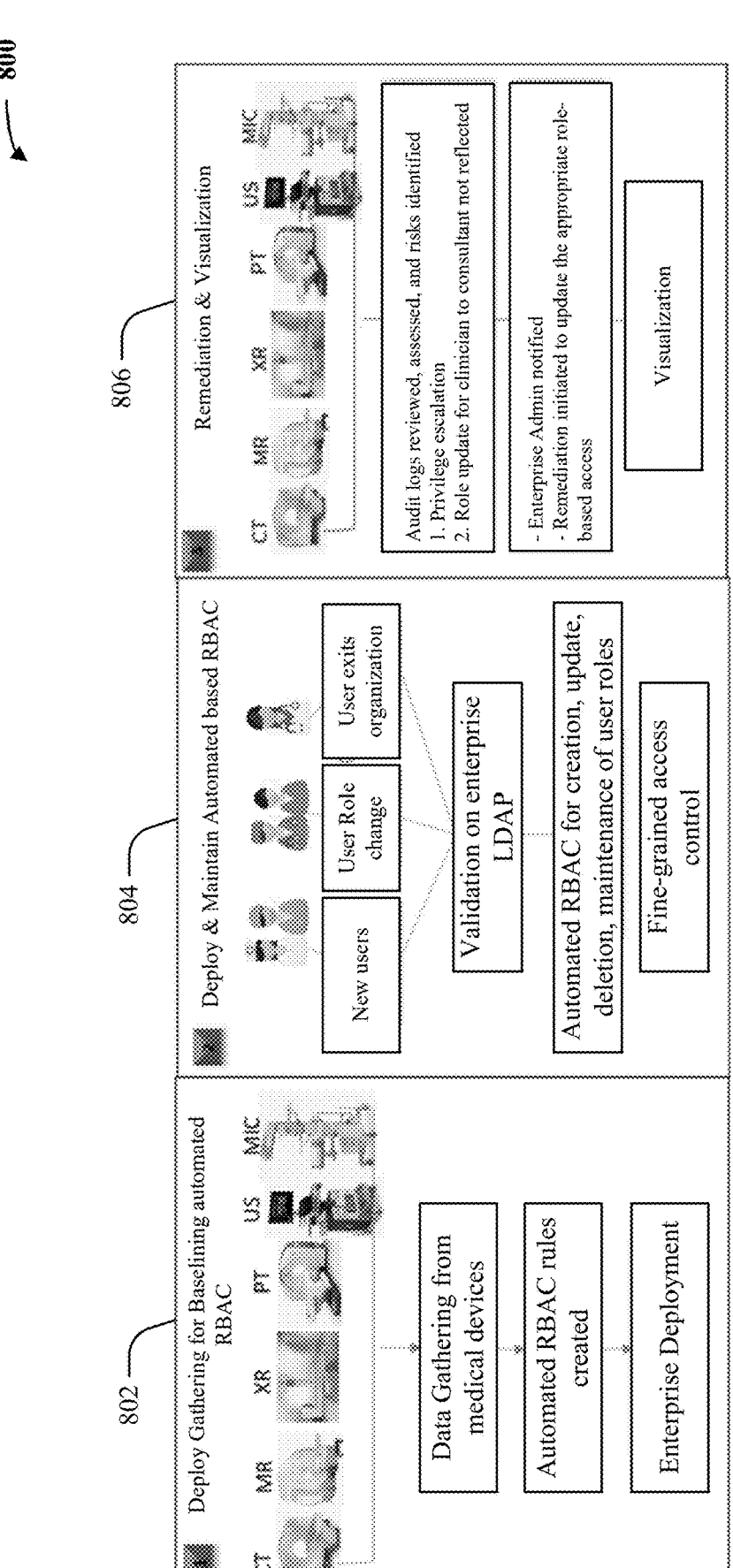
FIG. 8 illustrates a diagram of an example, non-limiting system that facilitates automated RBAC for PHI security and compliance in accordance with one or more embodiments described herein.

FIG. 8 illustrates a diagram of an example, non-limiting system that facilitates automated RBAC for PHI security and compliance in accordance with one or more embodiments described herein.

In various aspects, as depicted by 802, data can be gathered from various medical devices or systems (e.g., CT, MR, XR, PT, US, MIC) and accessed by the access component 110. Therefore, the model component 112 can receive the data gathered from the various medical devices or systems to generate automated RBAC rules 114. Thus, the automated RBAC rules can be deployed according to any suitable deployment method (e.g., deployment mode 1702, deployment model 704). For instance, the automated RBAC rules 114 can define access permissions in the case a first cardiologist refers a patient to another internal cardiologist for a procedure (e.g., the first cardiologist is granted access to the operation suite during patient treatment). In another instance, the automated RBAC rules 114 can define access permission in the case medical interns are working under supervision of an experienced clinician, (e.g., inters have restricted access to generate medical certificates or access medical legal documents). The automated RBAC rules 114 described herein are non-limiting examples and may comprise any suitable number or types of automated RBAC rules 114.

In various embodiments, as depicted by 804, LDAP 506 can be employed to verify new users, exiting users, or updated user roles. Accordingly, the automated RBAC rules 114 can be accessed to automatically assign the authorized permissions according to the user creation, deletion, or role change. Furthermore, the automated RBAC rules 114 can define the user access controls in a precise manner that mitigate potential for HIPAA or healthcare access regulations (e.g., by department, by role, by group, by policies).

In various instances, as depicted by 806, the detection component 116 can continuously and in real-time monitor audits to identify user access anomalies 118. For example, the detection component 116 can identify privilege escalation (e.g., compromised user credentials of a higher permission level) by monitoring the audit logs and user activity. Thus, the compliance component 302 can execute automated scripts that can remediate the identified anomaly. For example, if a user role update is not reflected on the user's authorized permissions, the compliance component 302 can update the appropriate role-based access permissions. In various cases, the notification component 304 can transmit an electronic notification to enterprise administrators of the detected anomalies. In other cases, the detected anomalies can be visually rendered on GUI 202 of the display component 120.

As an example, imaging radiology (e.g., MICT, MRI, Mamo, XRAY) interns can have clinical responsibilities under supervision of an experienced clinician, where treatments & patient records are reviewed by supervisor. The interns are restricted access to generate medical certificates, access medical legal documents, download EHR, or transfer EHR. The automated RBAC rules 114 can define role assignment and revocation conditions to enable prevention of errors (e.g., anomalies) with respect to user access and overhead involved in managing user access controls (e.g., attempted access to medical documents by an intern). Thus, such error prevention aids the healthcare organization to possess secure infrastructure to protect data in any scenario, contributing to appropriate data use and disclosure and adherence to HIPAA Privacy Rule.

As another example, when a first hospital has an affiliation with a second hospital, a cardiologist from the first hospital can review the patient and recommend a review with a clinical cardiac electrophysiology in the second hospital. When both hospitals are in association, the doctors have access to specific treating patients. As yet another example, when a first physician exits an organization, a second physician is a backfill and receives access to current and former patient records to follow up on pending studies, confirm a diagnosis, a patient's progress. In yet another example, when healthcare payers (e.g., insurance organizations, workers compensation, Social Security Disability, the Department of Veterans Affairs, or any institutional entity that pays for any portion of healthcare) need to access patient HER, the healthcare payers can receive access for verification or can receive copies as needed, thus maintaining medical records according to HIPAA laws. In any case, the automated RBAC rules 114 can define such access rules to enable the compliance component 302 to update user access to provide effective care to patients while providing secure data privacy that adheres to HIPAA regulations.

Figure 9:
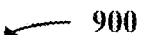
FIG. 9 illustrates a flow diagram of an example, non-limiting computer-implemented method that facilitates automated RBAC for PHI security and compliance in accordance with one or more embodiments described herein.

FIG. 9 illustrates a flow diagram of an example, non-limiting computer-implemented method 800 that facilitates automated RBAC for PHI security and compliance in accordance with one or more embodiments described herein. In various cases, the automated RBAC system 102 can facilitate the computer-implemented method 800.

In various embodiments, act 902 can include accessing, by a device (e.g., via 110) operatively coupled to a processor (e.g., 106), medical system historical data (e.g., 104) corresponding to medical systems or devices.

In various aspects, act 904 can include generating, by the device (e.g., via 116) and based on the medical system historical data (e.g., 104), automated RBAC rules (e.g., 114).

For instance, the automated RBAC rules (e.g., 114) can be generated by the deep learning neural network, based on the inputted medical system historical data (e.g., 104).

In various aspects, act 906 can include detecting, by the device (e.g., via 116) user access anomalies (e.g., 118). In various instances, the detection component 116 can continually and actively monitor for user access anomalies. Thus, user access anomalies can be detected in real-time.

In various cases, act 908 can include determining, by the device (e.g., via 116) if a user access anomaly has been detected. If yes (e.g., a user access anomaly has been detected), the non-limiting computer-implemented method 800 can proceed to act 910. If no, (e.g., a user access anomaly has not been detected), the non-limiting computer-implemented method 800 can proceed to act 906. For example, the detection component 116 can detect an administrator anomaly (e.g., 608) because a plurality of user accounts has been deleted within a small duration of time (e.g., an hour). In various cases, the detection component 116 can engage the artificial intelligence component 402 to detect user access anomalies. More specifically, the artificial intelligence component 402 can train the deep learning neural network to detect a user access anomaly based on training data (e.g., medical system historical data 104).

In various instances, act 910 can include displaying, by the device (e.g., via 120) and on a graphical user interface (e.g., 202), user access anomalies (e.g., 118). As an example, the administrator anomaly (e.g., 608) can be displayed to another administrator on a centralized GUI to notify the other administrator of occurrence of the anomaly.

In various instances, act 912 can include remediating, by the device (e.g., via 302), the user access anomalies (e.g., 118). For instance, the compliance component 302 can, in response to detection of the administrator anomaly (e.g., 608), revoke access or permissions from the administrator account. Therefore, the anomaly can be remediated without manual intervention from another administrator.

Although the herein disclosure mainly describes various embodiments as implementing deep learning neural networks, this is a mere non-limiting example. In various aspects, the herein-described teachings can be implemented via any suitable machine learning models exhibiting any suitable artificial intelligence architectures (e.g., support vector machines, naïve Bayes, linear regression, logistic regression, decision trees, random forest, reinforcement learning).

Although various embodiments are described herein with respect to GUIs, this is a mere non-limiting example for ease of explanation and illustration. In various other embodiments, the teachings described herein can be applied or extrapolated to any suitable electronic user interfaces (e.g., are not limited only to graphical user interfaces).

Indeed, various embodiments can include a computer program product for facilitating automated RBAC for PHI security and compliance. In various aspects, the computer program product can comprise a non-transitory computer-readable memory (e.g., 108) having program instructions embodied therewith. In various instances, the program instructions can be executable by a processor (e.g., 106) to cause the processor to: access medical system historical data (e.g., 104) corresponding to medical systems or devices; generate, based on the system historical data (e.g., 104), automated RBAC rules (e.g., 114); detect, based on the automated RBAC rules, user access anomalies (e.g., 118); and visually render, via an electronic user interface (e.g., 202 as a non-limiting example), user access anomalies (e.g., 118).

As it is employed in the subject specification, the term "patient health information (PHI)" can refer to "electronic patient health information (ePHI)".

In various instances, machine learning algorithms or models can be implemented in any suitable way to facilitate any suitable aspects described herein. To facilitate some of the above-described machine learning aspects of various embodiments, consider the following discussion of artificial intelligence (AI). Various embodiments described herein can employ artificial intelligence to facilitate automating one or more features or functionalities. The components can employ various AI-based schemes for carrying out various embodiments/examples disclosed herein. In order to provide for or aid in the numerous determinations (e.g., determine, ascertain, infer, calculate, predict, prognose, estimate, derive, forecast, detect, compute) described herein, components described herein can examine the entirety or a subset of the data to which it is granted access and can provide for reasoning about or determine states of the system or environment from a set of observations as captured via events or data. Determinations can be employed to identify a specific context or action, or can generate a probability distribution over states, for example. The determinations can be probabilistic; that is, the computation of a probability distribution over states of interest based on a consideration of data and events. Determinations can also refer to techniques employed for composing higher-level events from a set of events or data.

Such determinations can result in the construction of new events or actions from a set of observed events or stored event data, whether or not the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, and so on)) schemes or systems (e.g., support vector machines, neural networks, expert systems, Bayesian belief networks, fuzzy logic, data fusion engines, and so on) in connection with performing automatic or determined action in connection with the claimed subject matter. Thus, classification schemes or systems can be used to automatically learn and perform a number of functions, actions, or determinations.

A classifier can map an input attribute vector, $z=(Z_1, Z_2, Z_3, Z_4, Z_n)$, to a confidence that the input belongs to a class, as by $f(z)=$confidence (class). Such classification can employ a probabilistic or statistical-based analysis (e.g., factoring into the analysis utilities and costs) to determinate an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, or probabilistic classification models providing different patterns of independence, any of which can be employed. Classification as used herein also is inclusive of statistical regression that is utilized to develop models of priority.

Figure 10:
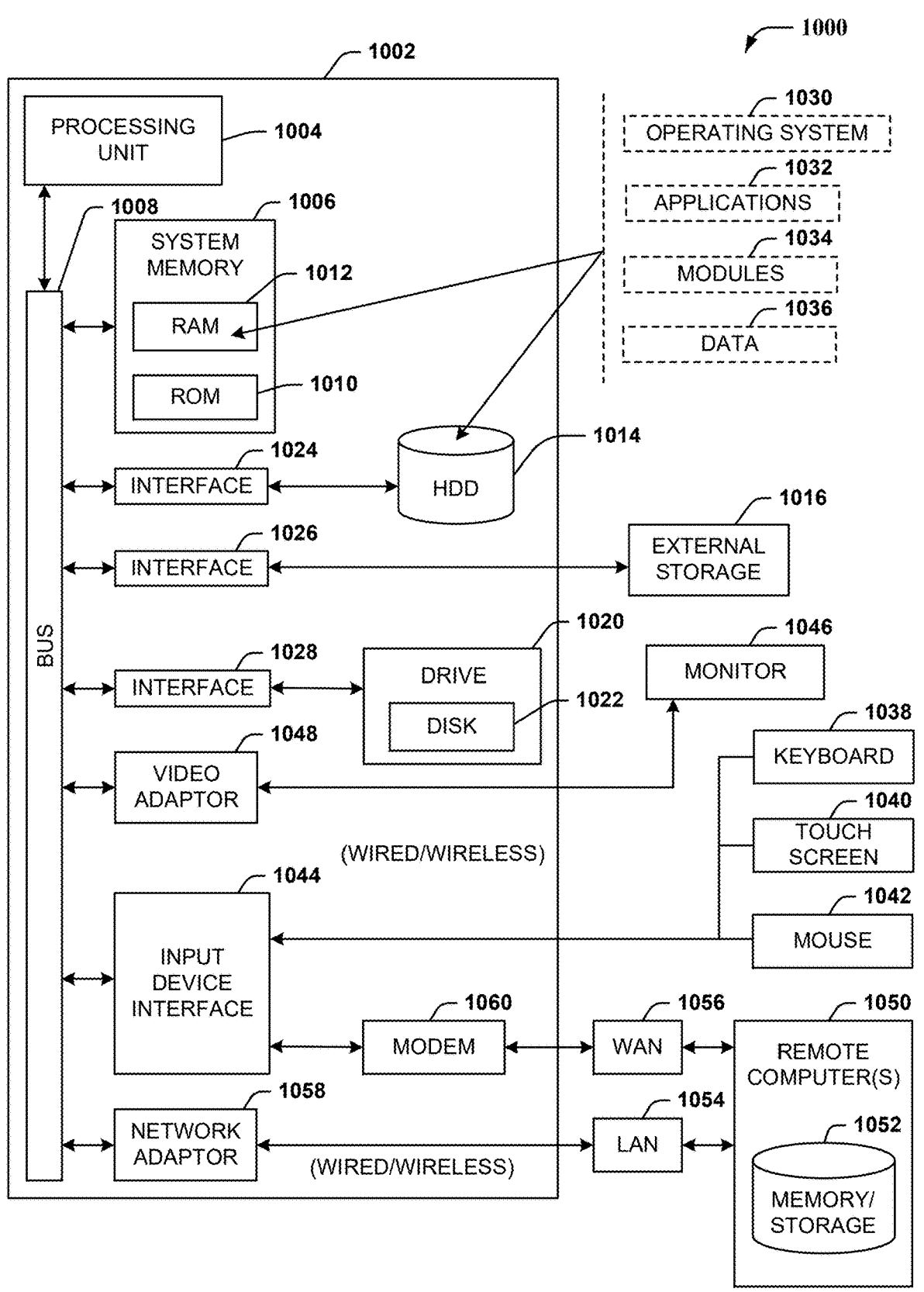
FIG. 10 illustrates a block diagram of an example, non-limiting operating environment in which one or more embodiments described herein can be facilitated.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multi-processor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and a drive 1020, e.g., such as a solid state drive, an optical disk drive, which can read or write from a disk 1022, such as a CD-ROM disc, a DVD, a BD, etc. Alternatively, where a solid state drive is involved, disk 1022 would not be included, unless separate. While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and drive 1020 can be connected to the system bus 1008 by an HDD interface 1024, an external storage interface 1026 and a drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above, such as but not limited to a network virtual machine providing one or more aspects of storage or processing of information. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 11:
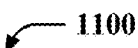
FIG. 11 illustrates an example networking environment operable to execute various implementations described herein.
Figure 11:
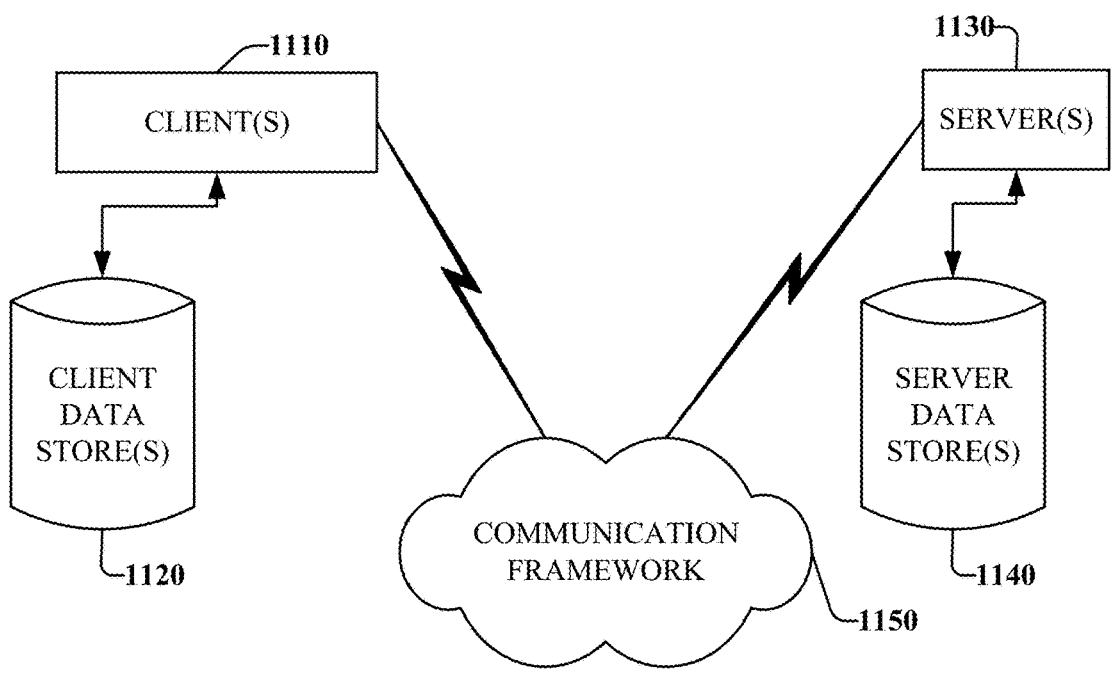

FIG. 11 is a schematic block diagram of a sample computing environment 1100 with which the disclosed subject matter can interact. The sample computing environment 1100 includes one or more client(s) 1110. The client(s) 1110 can be hardware or software (e.g., threads, processes, computing devices). The sample computing environment 1100 also includes one or more server(s) 1130. The server(s) 1130 can also be hardware or software (e.g., threads, processes, computing devices). The servers 1130 can house threads to perform transformations by employing one or more embodiments as described herein, for example. One possible communication between a client 1110 and a server 1130 can be in the form of a data packet adapted to be transmitted between two or more computer processes. The sample computing environment 1100 includes a communication framework 1150 that can be employed to facilitate communications between the client(s) 1110 and the server(s) 1130. The client(s) 1110 are operably connected to one or more client data store(s) 1120 that can be employed to store information local to the client(s) 1110. Similarly, the server(s) 1130 are operably connected to one or more server data store(s) 1140 that can be employed to store information local to the servers 1130.

Various embodiments may be a system, a method, an apparatus or a computer program product at any possible technical detail level of integration. The computer program product can include a computer readable storage medium (or media) having computer readable program instructions thereon for causing a processor to carry out aspects of various embodiments. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network or a wireless network. The network can comprise copper transmission cables, optical transmission fibers, wireless transmission, routers, firewalls, switches, gateway computers or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of various embodiments can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform various aspects.

Various aspects are described herein with reference to flowchart illustrations or block diagrams of methods, apparatus (systems), and computer program products according to various embodiments. It will be understood that each block of the flowchart illustrations or block diagrams, and combinations of blocks in the flowchart illustrations or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart or block diagram block or blocks. These computer readable program instructions can also be stored in a computer readable storage medium that can direct a computer, a programmable data processing apparatus, or other devices to function in a particular manner, such that the computer readable storage medium having instructions stored therein comprises an article of manufacture including instructions which implement aspects of the function/act specified in the flowchart or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart or block diagram block or blocks.

The flowcharts and block diagrams in the Figures illustrate the architecture, functionality, and operation of possible implementations of systems, methods, and computer program products according to various embodiments. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer or computers, those skilled in the art will recognize that this disclosure also can or can be implemented in combination with other program modules. Generally, program modules include routines, programs, components, data structures, etc. that perform particular tasks or implement particular abstract data types. Moreover, those skilled in the art will appreciate that various aspects can be practiced with other computer system configurations, including single-processor or multi-processor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, or a computer. By way of illustration, both an application running on a server and the server can be a component. One or more components can reside within a process or thread of execution and a component can be localized on one computer or distributed between two or more computers. In another example, respective components can execute from various computer readable media having various data structures stored thereon. The components can communicate via local or remote processes such as in accordance with a signal having one or more data packets (e.g., data from one component interacting with another component in a local system, distributed system, or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. As used herein, the term "and/or" is intended to have the same meaning as "or." Moreover, articles "a" and "an" as used in the subject specification and annexed drawings should generally be construed to mean "one or more" unless specified otherwise or clear from context to be directed to a singular form. As used herein, the terms "example" or "exemplary" are utilized to mean serving as an example, instance, or illustration. For the avoidance of doubt, the subject matter disclosed herein is not limited by such examples. In addition, any aspect or design described herein as an "example" or "exemplary" is not necessarily to be construed as preferred or advantageous over other aspects or designs, nor is it meant to preclude equivalent exemplary structures and techniques known to those of ordinary skill in the art.

The herein disclosure describes non-limiting examples. For ease of description or explanation, various portions of the herein disclosure utilize the term "each," "every," or "all" when discussing various examples. Such usages of the term "each," "every," or "all" are non-limiting. In other words, when the herein disclosure provides a description that is applied to "each," "every," or "all" of some particular object or component, it should be understood that this is a non-limiting example, and it should be further understood that, in various other examples, it can be the case that such description applies to fewer than "each," "every," or "all" of that particular object or component.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DR-RAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:

a memory configured to store computer-executable components; and a processor that executes at least one of the computer-executable components that:

accesses historical data corresponding to user access attempts to medical systems;

generates, using a trained machine learning model, based on the historical data, automated role-based access control (RBAC) rules, wherein the generating comprises selectively obtaining contextual information respectively for the user access attempts, and wherein the selectively obtaining comprises, for each user access attempt of the user access attempts:

determining whether the user access attempt was associated with a potential to violate a healthcare regulation, and based on a result of the determining:

in response to the result of the determining indicating that the user access attempt was not associated with the potential to violate the healthcare regulation, refraining from obtaining contextual information associated with the user access attempt, or in response to the result of the determining indicating that the user access attempt was associated with the potential to violate the healthcare regulation, obtaining the contextual information associated with the user access attempt and adding the contextual information to the historical data for the user access attempt;

detects, using the trained machine learning model, based on the automated RBAC rules, user access anomalies from audit logs of the medical systems; and visually renders, on a graphical user interface, the detected user access anomalies.

2. The system of claim 1, wherein the at least one of the computer-executable components further:

executes automated scripts to at least one of remediate the user access anomalies or implement user access changes by updating user roles or permissions.

3. The system of claim 1, wherein the historical data comprises at least one of the audit logs, internal medical system data, or customer sites data.

4. The system of claim 2, wherein the at least one of the computer-executable components revokes user access if privilege escalation is detected.

5. The system of claim 1, wherein the automated RBAC rules regulate at least one of user access, policy assignment, user role updates, user group updates, user policy updates, user deletion, password recovery, or user creation.

6. The system of claim 1, wherein the at least one of the computer-executable components identifies a user access anomaly comprising an unauthorized user attempting to access electronic protected health information (ePHI).

7. The system of claim 1, wherein the healthcare regulation is associated with at least one of a controlled substance or patient privacy.

8. The system of claim 1, wherein the at least one of the computer-executable components identifies a user access anomaly comprising at least one of failed user access attempts or successful user access attempts of a user satisfying a defined threshold within a duration that satisfying a defined threshold of time.

9. The system of claim 1, wherein the at least one of the computer-executable components identifies a user access anomaly comprising an administrator at least one of creating or deleting a number of accounts that satisfying a defined threshold within a duration that satisfying a defined threshold of time.

10. A computer-implemented method, comprising:

accessing, by a system operatively coupled to a processor, historical data corresponding to user access attempts to medical systems;

generating, by the system, using a trained machine learning model, based on the historical data, automated role-based access control (RBAC) rules, wherein the generating comprises selectively obtaining contextual information respectively for the user access attempts, and wherein the selectively obtaining comprises, for each user access attempt of the user access attempts:

determining whether the user access attempt was associated with a potential to violate a healthcare regulation, and based on a result of the determining:

in response to the result of the determining indicating that the user access attempt was not associated with the potential to violate the healthcare regulation, refraining from obtaining contextual information associated with the user access attempt, or in response to the result of the determining indicating that the user access attempt was associated with the potential to violate the healthcare regulation, obtaining the contextual information associated with the user access attempt and adding the contextual information to the historical data for the user access attempt;

detecting, by the system, using the trained machine learning model, based on the automated RBAC rules, user access anomalies from audit logs of the medical systems; and visually rendering, by the system, the detected user access anomalies on a graphical user interface.

11. The computer-implemented method of claim 10, further comprising:

executing, by the system, automated scripts to at least one of remediate the user access anomalies or implement user access changes by updating user roles or permissions.

12. The computer-implemented method of claim 10, wherein the historical data comprises at least one of the audit logs, internal medical system data, or customer sites data.

13. The computer-implemented method of claim 12, further comprising:

revoking, by the system, user access if privilege escalation is detected.

14. The computer-implemented method of claim 10, wherein the automated RBAC rules regulate at least one of user access, policy assignment, user role updates, user group updates, user policy updates, user deletion, password recovery, or user creation.

15. The computer-implemented method of claim 10, further comprising:

identifying, by the system, a user access anomaly comprising an unauthorized user attempting to access electronic protected health information (ePHI).

16. The computer-implemented method of claim 15, further comprising:

transmitting, by the system, an electronic notification to at least one of a patient or an organization associated with the ePHI of the patient in response to a detection that the unauthorized user attempted to access the ePHI of the patient.

17. The computer-implemented method of claim 10, further comprising:

identifying, by the system, a user access anomaly comprising at least one of failed user access attempts or successful user access attempts of a user satisfying a defined threshold within a duration that satisfying a defined threshold of time.

18. The computer-implemented method of claim 10, further comprising:

identifying, by the system, a user access anomaly comprising an administrator at least one of creating or deleting a number of accounts that satisfying a defined threshold within a duration that satisfying a defined threshold of time.

19. A computer program product for facilitating improved deep learning image processing, the computer program product comprising a non-transitory computer-readable memory having program instructions embodied therewith, wherein the program instructions are executable by a processor to cause the processor to:

access historical data corresponding to user access attempts to medical systems;

generate, using a trained machine learning model, based on the historical data, automated role-based access control (RBAC) rules, wherein the generating comprises selectively obtaining contextual information respectively for the user access attempts, and wherein the selectively obtaining comprises, for each user access attempt of the user access attempts:

determining whether the user access attempt was associated with a potential to violate a healthcare regulation, and based on a result of the determining:

in response to the result of the determining indicating that the user access attempt was not associated with the potential to violate the healthcare regulation, refraining from obtaining contextual information associated with the user access attempt, or in response to the result of the determining indicating that the user access attempt was associated with the potential to violate the healthcare regulation, obtaining the contextual information associated with the user access attempt and adding the contextual information to the historical data for the user access attempt;

detect, using the trained machine learning model, based on the automated RBAC rules, user access anomalies from audit logs of the medical systems; and visually render the detected user access anomalies on a graphical user interface.

20. The computer program product of claim 19, wherein the program instructions are executable by the processor to cause the processor to execute automated scripts to at least one of remediate the user access anomalies or implement user access changes by updating user roles or permissions.

\* \* \* \* \*